United States Patent
Izawa et al.

(10) Patent No.: US 7,340,334 B2
(45) Date of Patent: Mar. 4, 2008

(54) CONTROL DEVICE OF VARIABLE DAMPING FORCE DAMPER

(75) Inventors: Masaki Izawa, Wako (JP); Takafumi Kato, Wako (JP); Takashi Furuichi, Wako (JP); Minoru Higuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/797,420

(22) Filed: May 3, 2007

(65) Prior Publication Data

US 2008/0009992 A1 Jan. 10, 2008

(30) Foreign Application Priority Data

Jun. 7, 2006 (JP) .............................. 2006-158787

(51) Int. Cl.
  *B60G 17/018* (2006.01)
(52) U.S. Cl. ..................................... 701/37; 280/5.512
(58) Field of Classification Search ................. 701/36, 701/37, 38, 48; 280/5.5, 5.512, 5.514, 5.515
  See application file for complete search history.

(56) References Cited

U.S. PATENT DOCUMENTS

| | | | |
|---|---|---|---|
| 6,556,907 B1 * | 4/2003 | Sakai | 701/37 |
| 6,732,033 B2 * | 5/2004 | LaPlante et al. | 701/37 |
| 6,859,702 B2 * | 2/2005 | Kawashima et al. | 701/37 |
| 6,904,344 B2 * | 6/2005 | LaPlante et al. | 701/37 |

FOREIGN PATENT DOCUMENTS

| | | |
|---|---|---|
| JP | 60-113711 A | 6/1985 |
| JP | 6-247121 A | 9/1994 |

* cited by examiner

*Primary Examiner*—Richard M. Camby
(74) *Attorney, Agent, or Firm*—Arent Fox, LLP.

(57) ABSTRACT

A control device of a variable damping force damper for controlling a damping force of a damper used in a vehicle suspension system comprises: relative displacement detection means for detecting a value corresponding to a relative displacement between a vehicle body and a wheel in a vertical direction; relative speed detection means for detecting a value corresponding to a relative speed between the vehicle body and the wheel in the vertical direction; multiplying means for multiplying the value corresponding to the relative displacement and the value corresponding to the relative speed; and means for setting a damping force control target value of the damper based on the output from the multiplying means.

6 Claims, 6 Drawing Sheets

CONTROL DEVICE OF VARIABLE DAMPING FORCE DAMPER

TECHNICAL FIELD

The present invention relates to a control device of a variable damping force damper for controlling a damping force of a damper used in a vehicle suspension system.

BACKGROUND OF THE INVENTION

The spring used in a vehicle suspension system deforms to absorb an impact and springs back in the direction for recovering the deformation when an external force disappears, resulting in a reciprocal oscillation. In order to reduce the oscillatory energy of the spring, the vehicle suspension system is provided with a damper called a shock absorber. The damping force of the damper should be small in order to ease impact but should be of a certain large value in order to enhance the road holding ability and operational stability of the wheels. A variable damping force damper that can vary the damping force is known as a system that can satisfy such trade-off conditions (see Japanese Patent Application Laid-Open No. 60-113711, for example).

Meanwhile, so-called skyhook control is known as a way of damper control for improving riding comfort by using the variable damping force damper (see Japanese Patent Application Laid-Open No. 06-247121, for example). The basic idea of the skyhook control is generally explained below with respect to an exemplary situation where the wheel (or tire) runs over a projection on the road surface.

When the wheel runs onto the projection, the vehicle body moves upward and thus the sign of the vertical (or up-down) movement speed of the sprung mass is positive, while the damper undergoes contraction, resulting in a negative sign of its piston speed. When these two signs are opposite from each other like this, the damping force is controlled such that the damping force is reduced or the damper becomes softer.

Immediately after the wheel has passed over the top of the projection, the vehicle body continues to move upward due to inertia and thus the sign of the vertical speed of the sprung mass remains positive, but the damper is pulled up with the vehicle body and undergoes expansion, resulting in a positive sign of the piston speed. When the two signs are the same like this, the damping force is controlled such that the damping force is increased or the damper becomes stiffer.

When the wheel begins to move downward after running over the top of the projection, the damper is pulled downward by the unsprung mass and expands, thus the sign of the piston speed is kept positive. The vehicle body is also moved downward, and this makes the sign of the vertical movement speed of the sprung mass negative. Thus, the two signs are opposite from each other and the damping force is controlled such that the damping force is reduced or the damper becomes softer.

Then, immediately after the wheel has reached the flat road surface after completing running over the projection, the vehicle body continues to move downward due to inertia and thus the sign of the vertical movement speed of the sprung mass remains negative, while the damper undergoes contraction because the wheel has stopped downward movement, resulting in a negative sign of the piston speed. Thus, the two signs are the same and the damping force is controlled such that the damping force is increased or the damper becomes stiffer.

In the technique for carrying out skyhook control disclosed in JPA Laid-Open No. 06-247121, it should be particularly mentioned that a state quantity of the unsprung mass that changes in response to an input from the road surface or vehicle behavior is evaluated, and if it is determined from the state quantity that the vehicle is traveling on a road surface where the resonance frequency of the unsprung mass constitutes a main component of the oscillation frequency, the damping force is controlled with a weighting coefficient suited mainly for suppressing the oscillation of the unsprung mass.

In the technique disclosed in JPA Laid-Open No. 06-247121, because the damping force is controlled mainly for suppressing oscillation of the unsprung mass, the road holding ability of the wheels can be enhanced but it sometimes sacrifices the riding comfort.

BRIEF SUMMARY OF THE INVENTION

The present invention is made to solve such a problem in the prior art, and the main object of the invention is to provide an improved variable damping force damper that can control oscillation of the unsprung mass without deteriorating riding comfort.

To achieve such an object, the present invention provides a control device of a variable damping force damper for controlling a damping force of a damper used in a vehicle suspension system, comprising: relative displacement detection means for detecting a value corresponding to a relative displacement between a vehicle body and a wheel in a vertical direction; relative speed detection means for detecting a value corresponding to a relative speed between the vehicle body and the wheel in the vertical direction; multiplying means for multiplying the value corresponding to the relative displacement and the value corresponding to the relative speed; and means for setting a damping force control target value of the damper based on the output from the multiplying means. The relative displacement detection means may comprise a stroke sensor for the damper, for example, and the relative speed detection means may be embodied by a differentiating circuit for differentiating the output from the stroke sensor with respect to time, for example. In such a case, the value corresponding to the relative displacement between the vehicle body and the wheel is a damper displacement of the damper and the value corresponding to the relative speed between the vehicle body and the wheel is a damper speed of the damper. Preferably, the means for setting a damping force control target value determines a sign of the output from the multiplying means and changes the damping force control target value based on the sign.

The sign of the output from the multiplying means (i.e., the product of the value corresponding to the relative displacement between the vehicle body and the wheel and the value corresponding to the relative speed between the vehicle body and the wheel) can indicate a region where the amplitude of expanding/contracting speed of the damper is increasing (an acceleration region) and a region where the amplitude of expanding/contracting speed of the damper is decreasing (deceleration region). Thus, by using different control gains to respective regions, it is possible to optimally control the damping force to reduce the oscillation of the unsprung mass (such as the wheels) without adversely affecting the movement of the sprung mass (such as the vehicle body) and hence without deteriorating riding comfort.

Preferably, the means for setting a damping force control target value may comprise gain setting means for providing a gain to be multiplied with the output from the multiplying means, and the gain is set based on the sign of the output from the multiplying means. In this way, it is possible to adjust the damping force control target value depending on the sign from the multiplying mans with a simple configuration.

In one embodiment, the means for setting a damping force control target value outputs, as the damping force control target value, an absolute value of the output from the multiplying means multiplied with the gain. Alternatively, the means for setting a damping force control target value may output only the positive values of the output from the multiplying means multiplied with the gain, as the damping force control target value.

Further preferably, the means for setting a damping force control target value may adjust the damping force control target value depending on a lateral acceleration, longitudinal acceleration, or vehicle speed. Particularly, it is preferred that the means for setting a damping force control target value comprises gain setting means for setting a gain to be multiplied with the output from the multiplying means, and the gain is adjusted based on the lateral acceleration, longitudinal acceleration, or vehicle speed. In this way, differences in loads acting upon the wheels can be detected from the lateral acceleration, longitudinal (or front-rear) acceleration, and/or vehicle speed, and this can be used to adjust the damping coefficient (or gain provided by the gain setting means) for the damper of each wheel, whereby further optimizing the damping characteristics depending on the state of movement of the vehicle.

Thus, the present invention can considerably contribute to achieving both of riding comfort and operational stability at a higher level.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
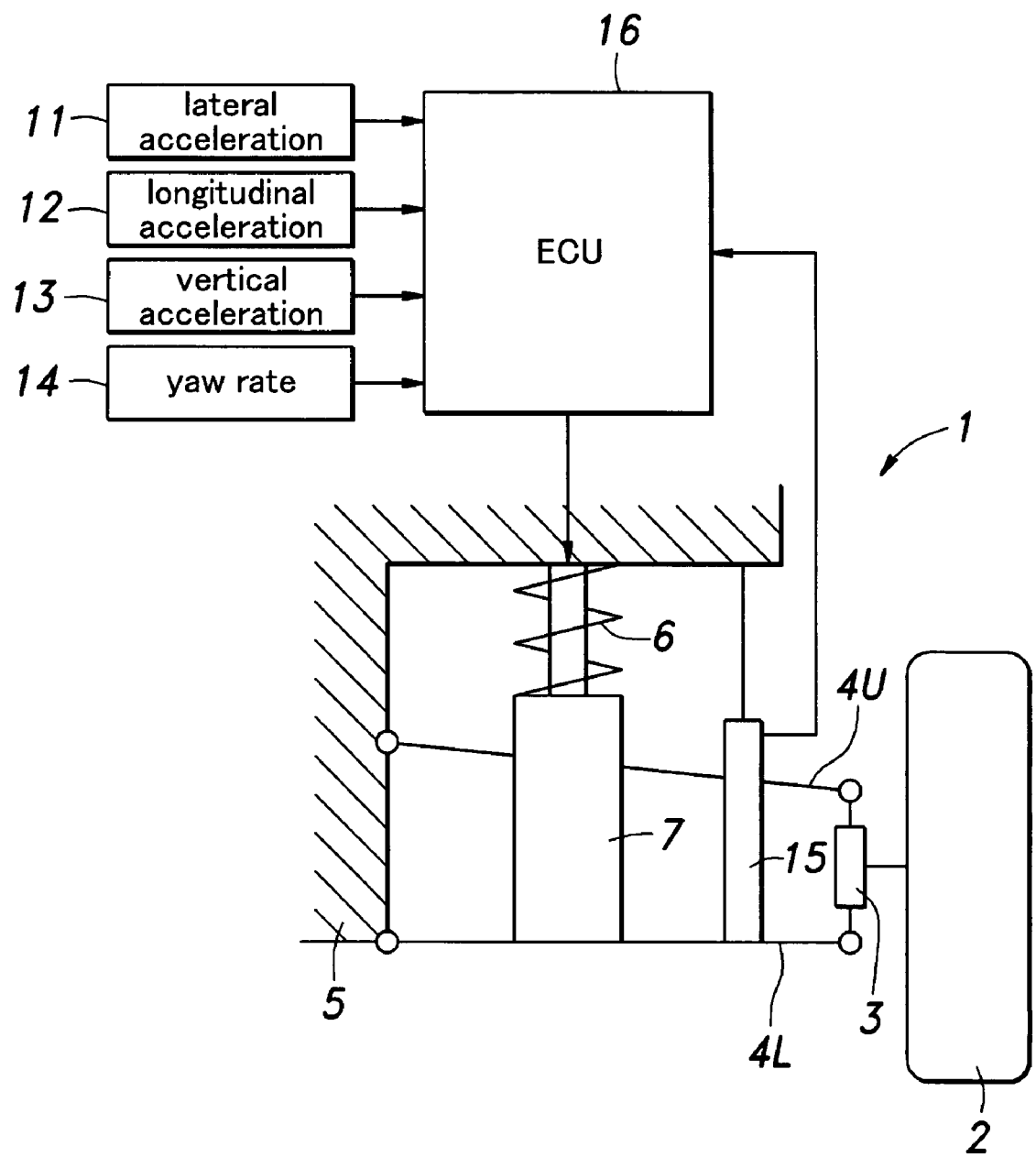
FIG. 1 is a schematic view for showing the general structure of a suspension system for a single wheel to which the present invention is applied.

FIG. 1 shows an example of a basic structure of a motor vehicle suspension system for supporting a vehicle body on left and right, front and rear wheels of a four-wheel vehicle. This suspension system 1 comprises a knuckle 3 for supporting a wheel 2, upper and lower suspension arms 4U, 4L for supporting the knuckle 3 so as to be moveable upward and downward with respect to the vehicle body 5, and a compression coil spring 6 and hydraulic damper 7 provided in parallel between the lower suspension arm 4L and the vehicle body 5.

The hydraulic damper 7 may consist of a variable damping force damper that is sealingly filled with an MRF (Magneto-Rheological Fluid), for example. In the damper 7, the MRF flows between a piston upper chamber and a piston lower chamber through an orifice provided to the piston as the piston moves up and down and the damper 7 expands and contracts, and an apparent viscosity of the MRF can be changed by controlling an electric current applied to an MLV (Magnetizable Liquid Valve) provided to the piston. In this way, the damping force can be changed continuously (see JPA Laid-Open No. 60-113711, for example).

The damping force of the damper 7 is controlled in accordance with a control target value computed by a computing unit in an electronic control unit (ECU) 16 based on each output from a lateral acceleration sensor 11, longitudinal acceleration sensor 12, vertical acceleration sensor 13, yaw rate sensor 14, damper stroke sensor 15, etc. such that the vehicle behavior is optimized.

Figure 2:
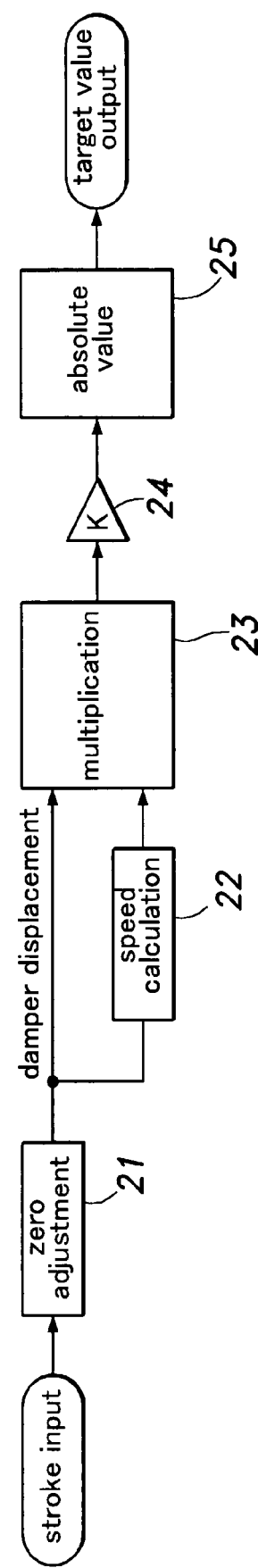
FIG. 2 is a control block diagram according to the present invention.

Next, a mode of damping force control using the damper stroke sensor 15 according to the present invention is described with reference to FIG. 2.

A displacement of the damper can be obtained from the output from the damper stroke sensor 15. The output from the damper stroke sensor 15 is passed through a zero-adjustment circuit 21 consisting of a high-pass filter, whereby the damper displacement in expansion and contraction with respect to a neutral point of the damper is obtained (the zero-adjustment circuit 21 should be calibrated beforehand with the output from the damper stroke sensor 15 while the vehicle is traveling on a flat road). The damper displacement in expansion and contraction is input to a speed calculation circuit 22 consisting of a differential filter to obtain a damper speed (or a piston speed with respect to a cylinder) in expansion and contraction.

A multiplying circuit 23A multiplies the damper displacement and the damper speed to provide a base damping force target value. The output from the multiplying circuit 23 (damper displacement×damper speed) is then multiplied with a prescribed gain (constant of proportionality) set by a gain setting circuit 24, and then converted into an absolute value by an absolute circuit 25 to provide a damping force control target value. It should be noted here that the prescribed gain (or damping coefficient) is set such that it is relatively large for the positive value of the output from the multiplying circuit 23 and relatively small for the negative value of the same, and the damping force control target value is obtained as a value proportional to the output from the multiplying circuit 23.

Figure 3:
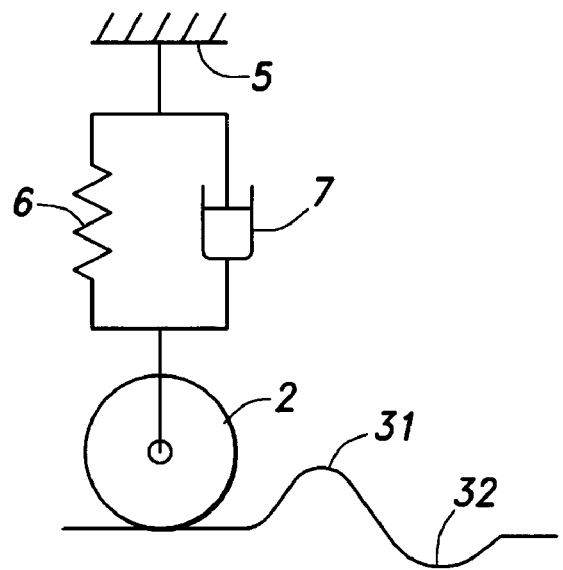
FIG. 3 is a schematic view of the suspension system shown with an exemplary road surface.
Figure 4:
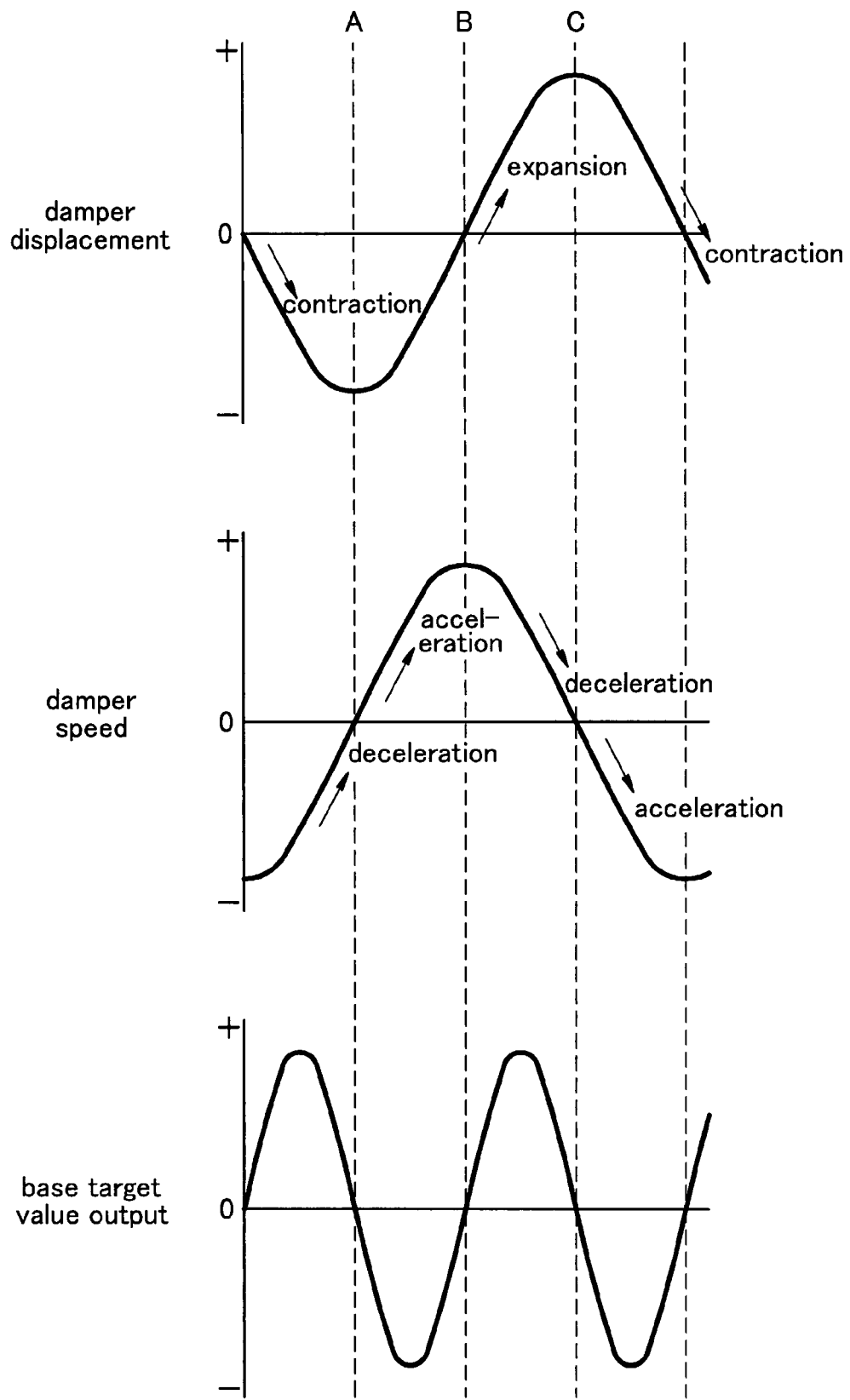
FIG. 4 shows graphs for explaining the operation of the present invention.

Next, with reference to FIGS. 3 and 4, the relationship between the wheel 2 and the vehicle body 5 is explained by taking as an example the situation where the wheel 2 passes over a bump and recess on the road surface. In the following explanation, the damper displacement is positive when the damper is in expansion and negative when the damper is in contraction. Also, the damper speed (or the displacement speed of the damper) is positive when the damper is undergoing expansion and negative when the damper is undergoing contraction.

When the wheel 2 runs onto a bump 31 on the road surface, the spring 6 and the damper 7 undergo displacement in the contracting direction while the amplitude of damper speed increases. In other words, the damper 7 contracts while experiencing acceleration.

As the wheel 2 comes closer to the top of the bump 31, the amount of displacement of the spring 6 and damper 7 in the contracting direction approaches to its maximum, and the compression reactive force of the spring 6 increases to reduce the amplitude of the displacement speed of the damper 7. In other words, the damper contracts while experiencing deceleration. When the wheel 2 reaches the top of the bump 31, the amount of contracting displacement of the damper 7 is maximized and the displacement speed of the damper 7 becomes zero (point A in FIG. 4).

Once the wheel 2 has passed the top of the bump 31, the reaction force of the spring 6 causes the spring 6 and damper 7 to start expanding while the amplitude of damper speed increases. That is, the damper 7 undergoes expansion while experiencing acceleration. After the wheel 2 has run over the bump 31 and moved down into a recess 32, the displacement speed of the damper 7 reaches its peak at the neutral point where the damper displacement is zero (point B in FIG. 4).

As the wheel 2 approaches to the bottom of the recess 32, the expansion reactive force of the spring 6 increases to reduce the expansion speed of the damper 7. In other words, the damper expands while experiencing deceleration. Then, when the wheel 2 reaches the bottom of the recess 32, the amount of expanding displacement of the damper 7 is maximized and the displacement speed of the damper 7 becomes zero (point C in FIG. 4).

After the wheel 2 has passed the bottom of the recess 32, the spring 6 and the damper 7 undergo contraction while the amplitude of damper speed increases. In other words, the damper 7 contracts while experiencing acceleration.

By multiplying the damper displacement and the damper speed, it is possible to determine from the sign thereof whether the damper 7 is accelerating or decelerating (positive sign means acceleration while negative sign means deceleration). Thus, by appropriately varying the gain (or damping coefficient) depending on the sign of the product of the damper displacement and the damper speed, reduction of bouncing feel as well as suppression of overshoot (or overoscillation) of the unsprung mass when the wheel 2 travels over bumps and recesses on the road surface can be achieved without deteriorating the road holding ability of the wheel 2.

More concretely, when the damper 7 contracts while experiencing deceleration (the sign of the product of the damper displacement and the damper speed is positive), the damping coefficient is made higher to stiffen the damper 7 and thereby suppress oscillation of the wheel 2. When the damper 7 expands while experiencing acceleration (the sign of the product of the damper displacement and the damper speed is negative), the damping coefficient is made lower to make the damper 7 softer and thereby ensure preferable road holding. When the damper 7 expands while experiencing deceleration (the sign of the product of the damper displacement and the damper speed is positive), the damping coefficient is made higher to stiffen the damper 7 and thereby suppress oscillation of the wheel 2. When the damper 7 contracts while experiencing acceleration (the sign of the product of the damper displacement and the damper speed is negative), the damping coefficient is made lower to make the damper 7 softer and thereby prevent a shock from the road surface from being transmitted to the vehicle body 5.

Thus, in the regions where the vehicle body 5 may receive a jolt, the damping force control target value is set low to improve riding comfort, while in the regions where the movement of wheel 2 may overshoot, the damping force control target value is set high to suppress oscillation, and such a control can be achieved by simply changing the gain depending on the sign of the product between the damper displacement and the damper speed.

Next, an explanation is made to an adjustment of gain weighting in the gain setting circuit 24 that determines the control target value for the damping force of the damper.

Figure 5:
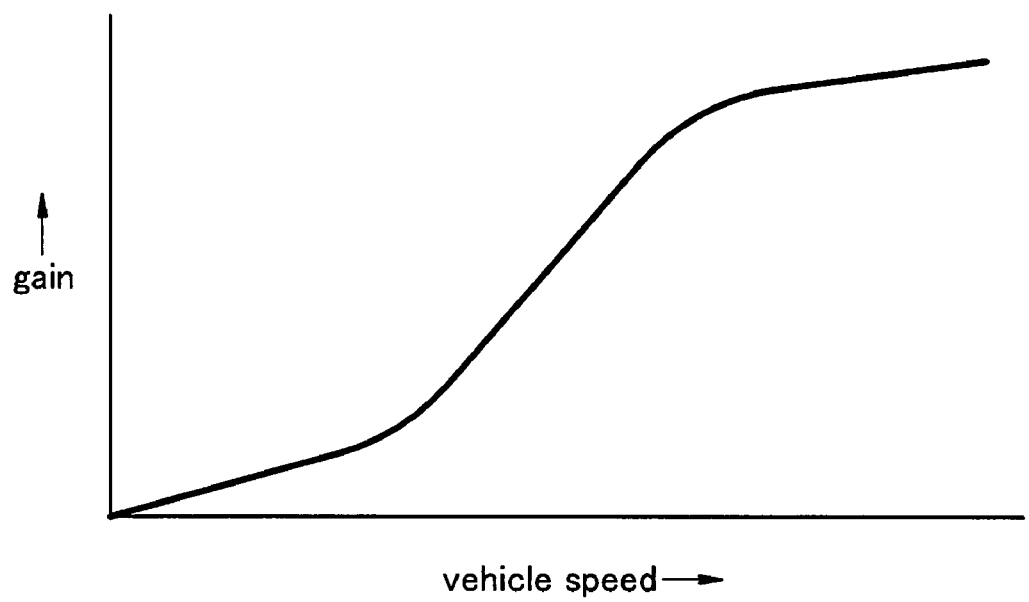
FIG. 5 is a graph showing the characteristics of a map for obtaining an adjusted damping coefficient with respect to a vehicle speed.

The gain setting circuit 24 stores a vehicle speed map for varying an adjusted damping coefficient (or gain) depending on the vehicle speed. As shown in FIG. 5, in this vehicle speed map, the rate of increase changes in three steps with the vehicle speed. For example, in a normal speed region up to 100 km/hour, the rate of increase of the adjusted coefficient with respect to the increase in the vehicle speed is low, in a high speed region from 100 km/hour to 200 km/hour, the rate of increase of the adjusted coefficient with respect to the increase in the vehicle speed is high, and in a very high speed region over 200 km/hour, the rate of increase of the adjusted coefficient with respect to the increase in the vehicle speed is quite low and eventually reaches a ceiling.

When the vehicle is traveling straight, the adjusted coefficient obtained from the vehicle speed map is used commonly to the four wheels. Thus, in the normal speed region up to 100 km/hour, a relatively low damping coefficient suitable for enhancing riding comfort is used (i.e., the damper is made softer) while in the high speed region, a relatively high damping coefficient suitable for achieving an operational stability is used (the damper is made stiffer).

Figure 6:
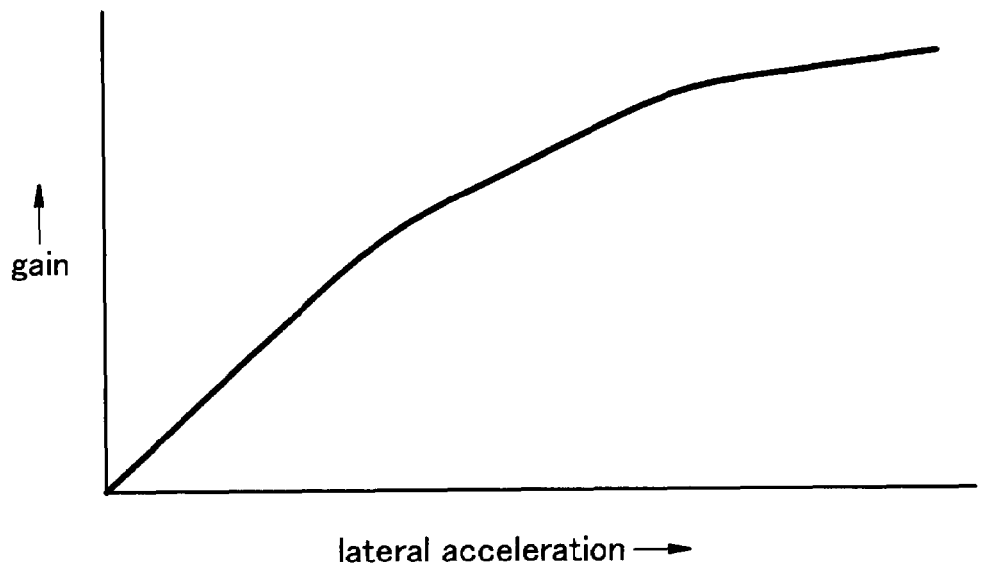
FIG. 6 is a graph showing the characteristics of a first map for obtaining an adjusted damping coefficient with respect to a lateral acceleration.
Figure 7:
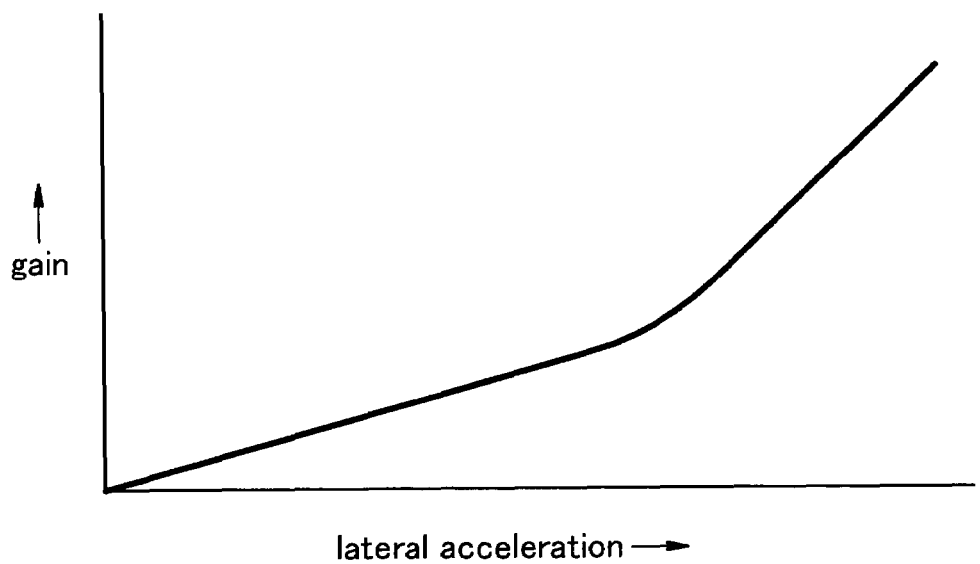
FIG. 7 is a graph showing the characteristics of a second map for obtaining an adjusted damping coefficient with respect to a lateral acceleration.

The gain setting circuit 24 further comprises a first lateral acceleration map and a second lateral acceleration map for varying the adjusted damping coefficient depending on the lateral acceleration. As shown in FIG. 6, the first lateral acceleration map is provided with a characteristic where the rate of increase of the adjusted coefficient is gradually reduced with the increase in the lateral acceleration. On the other hand, as shown in FIG. 7, the second lateral acceleration map is provided with a characteristic where the rate of increase of the adjusted coefficient is gradually increased with the increase in the lateral acceleration.

When the vehicle turns, the adjusted coefficients obtained from the first and second lateral acceleration maps are used. Specifically, in the case where the lateral acceleration is relatively low such as when the vehicle turns at a low speed or with a small steering angle, a relatively low damping coefficient suitable for maintaining riding comfort is used, while in the case where the lateral acceleration is relatively high such as when the vehicle turns at a high speed or with a large steering angle, a relatively high damping coefficient suitable for improving operational stability is used. Further, the damping coefficients for the dampers on the outer side of the turning vehicle where the wheels need to support larger loads due to the lateral acceleration are set to a higher value than those for the inner dampers.

Figure 8:
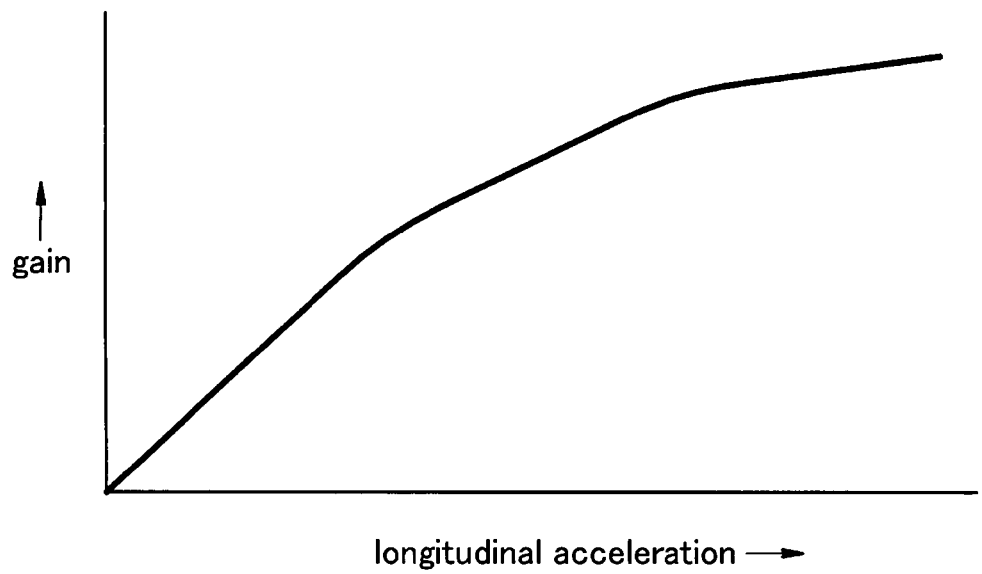
FIG. 8 is a graph showing the characteristics of a first map for obtaining an adjusted damping coefficient with respect to a longitudinal acceleration.
Figure 9:
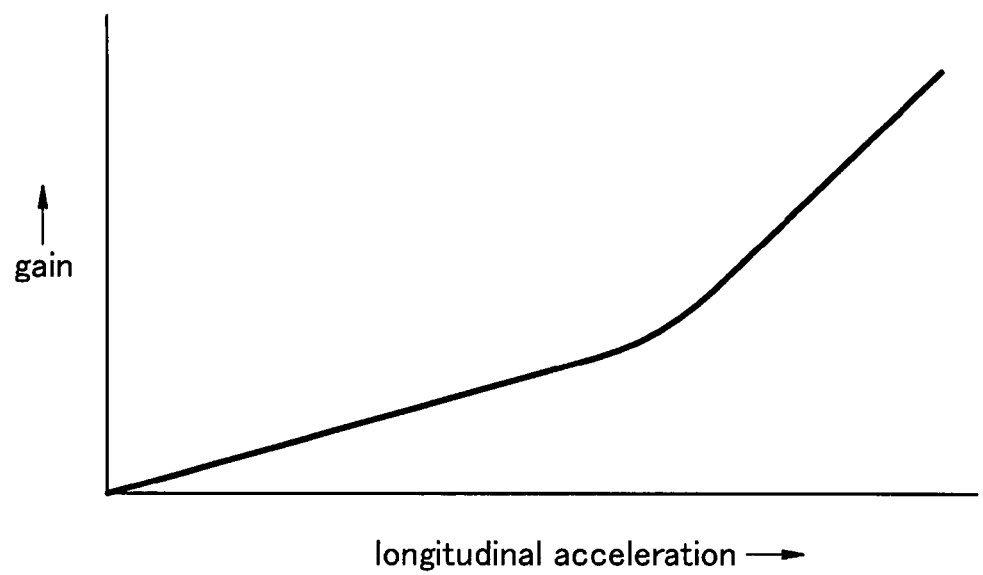
FIG. 9 is a graph showing the characteristics of a second map for obtaining an adjusted damping coefficient with respect to a longitudinal acceleration.

The gain setting circuit 24 further comprises a first longitudinal acceleration map and a second longitudinal acceleration map for varying the adjusted damping coefficient depending on the longitudinal acceleration. As shown in FIG. 8, the first longitudinal acceleration map is provided with a characteristic where the rate of increase of the adjusted coefficient is gradually reduced with the increase in the longitudinal acceleration. On the other hand, as shown in FIG. 9, the second longitudinal acceleration map is provided with a characteristic where the rate of increase of the adjusted coefficient is gradually increased with the increase in the longitudinal acceleration.

When the vehicle is braked, the adjusted coefficients obtained from the first and second longitudinal acceleration maps are used in such a manner that the damping coefficients for the front dampers where the wheels need to support larger loads due to the shift of center of gravity resulting from the deceleration are set to a higher value than those for the rear dampers. Also, under moderate braking in which the amplitude of deceleration is relatively small, a relatively low damping coefficient suitable for maintaining riding comfort is used, while under heavy braking in which the amplitude of deceleration is relatively large, a relatively high damping coefficient is used to suppress the postural change.

When the vehicle is accelerated, the adjusted coefficients obtained from the first and second longitudinal acceleration maps are used in such a manner that the damping coefficients for the rear dampers where the wheels need to support larger loads due to the shift of center of gravity resulting from the acceleration are set to a higher value than those for the front dampers. Also, under moderate acceleration in which the amplitude of acceleration is relatively small, a relatively low damping coefficient suitable for maintaining riding comfort is used, while under rapid acceleration in which the amplitude of acceleration is relatively large, a relatively high damping coefficient is used to suppress the postural change.

Thus, by using the damping coefficient adjustment maps in proper combination depending on various operational conditions, such as acceleration/deceleration during the straight movement of the vehicle or acceleration/deceleration during the turning movement of the vehicle, it is possible to optimally control the damping force of each of the dampers for the left and right, front and rear wheels.

It should be mentioned that the base damping force target value obtained by applying the above adjusted coefficients may not have to be converted into an absolute value by the absolute circuit 23 and alternatively, it may be possible to use only the positive values thereof by processing the base damping force target value with a saturation circuit or the like.

In applying the present application to practice, the concrete structure of the damping force varying means may not have to be limited to a particular embodiment, and the damping force varying means may be embodied in various ways such as by using a rotary valve for switching an area of a mechanical orifice, for example.

Although the present invention has been described in terms of preferred embodiments thereof, it is obvious to a person skilled in the art that various alterations and modifications are possible without departing from the scope of the present invention which is set forth in the appended claims.

The present application is based on, and claims priority from, Japanese Patent Application No. 2006-158787 filed on Jun. 7, 2006, the disclosure of which is hereby incorporated by reference herein in its entirety.

The invention claimed is:

1. A control device of a variable damping force damper for controlling a damping force of a damper used in a vehicle suspension system, comprising:

relative displacement detection means for detecting a value corresponding to a relative displacement between a vehicle body and a wheel in a vertical direction;

relative speed detection means for detecting a value corresponding to a relative speed between the vehicle body and the wheel in the vertical direction;

multiplying means for multiplying the value corresponding to the relative displacement and the value corresponding to the relative speed; and means for setting a damping force control target value of the damper based on the output from the multiplying means.

2. The control device of a variable damping force damper according to claim 1, wherein the means for setting a damping force control target value determines a sign of the output from the multiplying means and changes the damping force control target value based on the sign.

3. The control device of a variable damping force damper according to claim 2, wherein the means for setting a damping force control target value comprises gain setting means for providing a gain to be multiplied with the output from the multiplying means, and the gain is set based on the sign of the output from the multiplying means.

4. The control device of a variable damping force damper according to claim 1, wherein the value corresponding to the relative displacement between the vehicle body and the wheel is a damper displacement of the damper and the value corresponding to the relative speed between the vehicle body and the wheel is a damper speed of the damper.

5. The control device of a variable damping force damper according to claim 1, wherein the means for setting a damping force control target value adjusts the damping force control target value depending on a lateral acceleration, longitudinal acceleration, or vehicle speed.

6. The control device of a variable damping force damper according to claim 5, wherein the means for setting a damping force control target value comprises gain setting means for setting a gain to be multiplied with the output from the multiplying means, and the gain is adjusted based on the lateral acceleration, longitudinal acceleration, or vehicle speed.

* * * * *